(12) United States Patent
Park et al.

(10) Patent No.: US 9,837,863 B2
(45) Date of Patent: Dec. 5, 2017

(54) PORTABLE TERMINAL HAVING A WIRELESS CHARGING MODULE

(71) Applicant: Samsung Electronics Co., Ltd., Gyeonggi-do (KR)

(72) Inventors: Se-Ho Park, Gyeonggi-do (KR); Joon-Il Kim, Seoul (KR); Woo-Ram Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 169 days.

(21) Appl. No.: 14/343,293

(22) PCT Filed: Sep. 19, 2012

(86) PCT No.: PCT/KR2012/007489
§ 371 (c)(1),
(2) Date: Mar. 6, 2014

(87) PCT Pub. No.: WO2013/048052
PCT Pub. Date: Apr. 4, 2013

(65) Prior Publication Data
US 2015/0326054 A1    Nov. 12, 2015

(30) Foreign Application Priority Data

Sep. 30, 2011 (KR) .................. 10-2011-0099869
Sep. 14, 2012 (KR) .................. 10-2012-0102428

(51) Int. Cl.
*H02J 50/12* (2016.01)
*H02J 7/00* (2006.01)
(Continued)

(52) U.S. Cl.
CPC .............. *H02J 50/12* (2016.02); *H02J 7/007* (2013.01); *H02J 7/0042* (2013.01);
(Continued)

(58) Field of Classification Search
CPC ............. H02J 7/025; H02J 17/00; H02J 5/005
(Continued)

(56) References Cited

U.S. PATENT DOCUMENTS

2007/0232371 A1* 10/2007 Soekawa .......... G06K 19/07749
455/575.5
2011/0050164 A1* 3/2011 Partovi ................... H01F 5/003
320/108
2011/0234155 A1 9/2011 Chen et al.

FOREIGN PATENT DOCUMENTS

JP   2008011275    1/2008
JP   2010161618    7/2010
(Continued)

OTHER PUBLICATIONS

JP2008011275—Machine Translation. Generated Feb. 2, 2017.*
PCT/ISA/237 Written Opinion issued on PCT/KR2012/007489(pp. 6).
PCT/ISA/210 Search Report issued on PCT/KR2012/007489 (pp. 3).

*Primary Examiner* — Nathan Mitchell
*Assistant Examiner* — Ernest Tacsik
(74) *Attorney, Agent, or Firm* — The Farrell Law Firm, P.C.

(57) ABSTRACT

A portable terminal is provided. The portable terminal includes a back surface on which a battery-mounting groove is formed; and a receiving-side resonant antenna arranged around the battery-mounting groove on the body. The receiving-side resonant antenna is arranged parallel to at least three sides of the battery-mounting groove.

6 Claims, 5 Drawing Sheets

(51) Int. Cl.
*H04M 1/02* (2006.01)
*H04M 1/73* (2006.01)
*H04B 1/38* (2015.01)
*H02J 7/02* (2016.01)
*H04B 1/3888* (2015.01)

(52) U.S. Cl.
CPC ............ *H02J 7/0052* (2013.01); *H02J 7/025* (2013.01); *H04B 1/38* (2013.01); *H04B 1/3888* (2013.01); *H04M 1/0202* (2013.01); *H04M 1/73* (2013.01); *H04M 2001/0204* (2013.01)

(58) Field of Classification Search
USPC ....................................................... 320/108
See application file for complete search history.

(56) References Cited

FOREIGN PATENT DOCUMENTS

| | | |
|---|---|---|
| KR | 1020040054443 | 6/2004 |
| KR | 1020040073620 | 8/2004 |

\* cited by examiner

PORTABLE TERMINAL HAVING A WIRELESS CHARGING MODULE

PRIORITY

This application is a National Phase Entry of PCT International Application No. PCT/KR2012/007489, which was filed Sep. 19, 2012, and claims priority to Korean Patent Application Nos. 10-2011-0099869 and 10-2012-0102428 filed Sep. 30, 2011 and Sep. 14, 2012, respectively, the entire contents of each of which are incorporated herein by reference.

BACKGROUND

1. Field of the Invention

The present invention generally relates to a portable terminal such as a cellular phone, a smart phone or a tablet PC, and more particularly, to a portable terminal provided with a wireless charging module.

2. Description of the Related Art

A portable terminal, such as a mobile communication terminal such as a cellular phone, a smart phone or the like, is incorporated with more and more functions as multimedia services continue to expand. In addition, as various application programs are provided, the functions of the portable terminal are increasing more rapidly and user interface environments are being developed to be conveniently used as well as to satisfy various users' tastes and needs.

Portable terminals may be classified into, for example, a bar-type terminal, a folder-type terminal, a sliding-type terminal, and a swing-type terminal according to the external appearances thereof. When mobile communications such as voice communications and short message transmissions were principal functions, folder-type terminals or slider-type terminals occupied a great part of the market. However, as the multimedia services have been developed as described above, the necessity of enlarged display devices of portable terminals has increased. Accordingly, as the display devices of portable terminals have been enlarged recently, physical keypads tend to be removed from the portable terminal by incorporating a touch screen function in the display devices. The portability of a portable terminal is improved by providing a touch screen device to remove a physical keypad so that a display device may be enlarged and a thickness of a portable terminal is reduced.

In addition, a portable terminal is provided with antenna devices that enable communication in various frequency bands such as a DMB (Digital Multimedia Broadcasting) antenna, a LAN (Local Area Network) antenna, an NFC (Near Field Communication) antenna, a Bluetooth antenna and the like in addition to an antenna device for a wireless communication function. Recently, beyond such antenna devices, a portable terminal is equipped with an antenna and a module that provides a mobile charging function.

FIG. 1 is an exploded perspective view illustrating a portable terminal 100 according to the prior art. In particular, FIG. 1 illustrates a configuration provided with a wireless charging module that includes a receiving-side resonant antenna 131 that provides a wireless charging function and a receiving circuit unit provided on a substrate 133.

As illustrated in FIG. 1, the terminal 100 includes a battery mounting groove 119 formed on a back surface of a body 101, and a camera module 117 provided at a side of the battery mounting groove 119. The battery mounting groove 119 is concealed by a cover member 102 detachably provided on the back surface of the body 101. A user may access the battery mounting groove 119 by removing the cover member 102 as needed. In addition, the cover member 102 is provided with an opening 127 that exposes the camera module 117 so that a subject may be photographed even when the cover member 102 is coupled to the body 101.

The cover member 102 is provided with a wireless charging module 130 on the inner surface thereof. The wireless charging module 130 includes a receiving-side resonant antenna 131 and a receiving circuit unit. A second cover member 141 may be provided on the inner surface of the cover member 102 so as to provide a stable installment structure of the receiving-side resonant antenna 131 and the receiving circuit unit.

The receiving-side resonant antenna 131 may produce a signal power by a magnetic induction or magnetic resonance phenomenon according to an electromagnetic field generated at a primary coil of a charger (not illustrated) and transmits the signal power to the receiving circuit unit. A connection piece 131a connected to the receiving circuit unit is formed at a side of the receiving-side resonant antenna 131. The receiving-side resonant antenna 131 is configured to be attached to the inner surface of the cover member 102. In the portable terminal 100 illustrated in FIG. 1, the second cover member 141 is coupled to the cover member 102 when the receiving-side resonant antenna 131 is attached to the inner surface of the second cover member 141. As a result, the receiving-side resonant antenna 131 is disposed on the inner surface of the cover member 102.

The terminal 100 is provided with an electromagnetic shielding member 139 in order to reduce or eliminate an effect exerted on circuit devices inside the body or a battery pack by the electromagnetic field formed around the receiving-side resonance antenna 131. The electromagnetic shielding member 139 is attached on the cover member 102 and interposed between the receiving-side resonant antenna 131 and the body 102. As mentioned above, since the receiving-side resonant antenna 131 is directly attached to the second cover member 141, the receiving-side resonant antenna 131 may be attached on the electromagnetic shielding member 139 after the electromagnetic shielding member 139 is attached to the second cover member 141 in advance.

Since the receiving circuit unit includes the wireless charging circuit provided on the substrate 133, the receiving circuit unit converts a signal power received through the receiving-side resonant antenna 131 into a charging power and provides the charging power to the battery pack mounted on the body 101. A connection portion 131b corresponding to the connection piece 131a is provided at a side of the substrate 133. The receiving circuit unit is also attached to the second cover member 141 together with the receiving-side resonant antenna 131. When the receiving-side resonant antenna 131 and the receiving circuit unit are attached to the second cover member 141, the connection piece 131a and the connection portion 131b are engaged with each other to be electrically connected.

A flexible printed circuit board 135 is disposed at a side of the receiving circuit unit and a connection pad 137 is provided at an end of the flexible printed circuit board 135. The charging power provided from the receiving circuit unit is transmitted to the body 101 through the flexible printed circuit board 135 and the connection pad 137. The body 101 is provided with connection terminals 115 provided at a side of the battery mounting groove 119 and, when the cover member 102 is coupled to the body 101, the connection pad 137 is connected with the connection terminals 115, thereby providing the charging power to the body 101, in particular, to the battery pack mounted on the body 101.

FIG. 2 schematically illustrates a configuration of the wireless charging module disposed on the cover member 102. FIG. 2 describes the height h of the wireless charging module 130, i.e. the thickness. It is noted that the second cover member 141 is not illustrated and the wireless charging module 130 is illustrated as being configured to be directly attached to the cover member 102.

The receiving-side resonance antenna 131 and the electromagnetic shielding member 139 are stacked on the inner surface of the cover member 102 and the receiving circuit unit includes circuit elements 133a, such as a charging control circuit chip and an inductor which are mounted on the substrate 133. The thicknesses of the receiving-side resonant antenna 131 and the substrate 133 are about 0.35 mm, the thickness of the electromagnetic shielding member 139 is about 0.6 mm, and the maximum height of the circuit elements 133a is about 1.25 mm. Accordingly, the maximum thickness of the wireless charging module 130 from the inner surface of the cover member 102 is about 1.6 mm.

As described above, as the multimedia functions of portable terminals have been developed, display devices have been enlarged and efforts are continuing to reduce the thickness of the portable terminals as well as the weight of the portable terminals, for portability. However, a wireless charging module may make it convenient to charge a portable terminal but increases the thickness of the portable terminal. Especially, since portable terminals having a thickness of not more than 10 mm prevails according to the tendency of slimming portable terminals, equipping a wireless charging module having a thickness of 1.6 mm in a portable terminal will cause a result of going against trend of the slimming of portable terminals.

In addition, when the receiving-side resonant antenna or the receiving circuit unit is positioned to face the battery pack, there is a problem in that the thickness of the portable terminal is further increased. The battery pack is rectangular and has a predetermined volume. Therefore, when the receiving-side resonant antenna or the like is positioned to face the battery pack, a predetermined thickness of the portable terminal should be secured in order to secure a space capable of accommodating the receiving-side resonant antenna or the like.

SUMMARY

The present invention has been made to address at least the problems and disadvantages described above, and to provide at least the advantages described below. Accordingly, an aspect of the present invention is to provide a portable terminal which is equipped with a wireless charging module including an additional antenna, in particular, a receiving-side resonant antenna so that convenience in use may be improved.

Another aspect of, the present invention is to provide a portable terminal of which an increase in thickness is suppressed even though the portable terminal is equipped with a wireless charging module so that portability may be easily secured.

According to an aspect of the present invention, a portable terminal includes a body having a back surface on which a battery mounting groove is formed; and a receiving-side resonant antenna arranged around the battery mounting groove on the body, which the receiving-side resonant antenna is arranged parallel to at least three sides of the battery mounting groove.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, several embodiments of the present invention will be described with reference to the accompanying drawings. Detailed descriptions on related well-known functions or configurations will be omitted in the following description of the present invention when they may make the gist of the present invention unclear.

Figure 1:
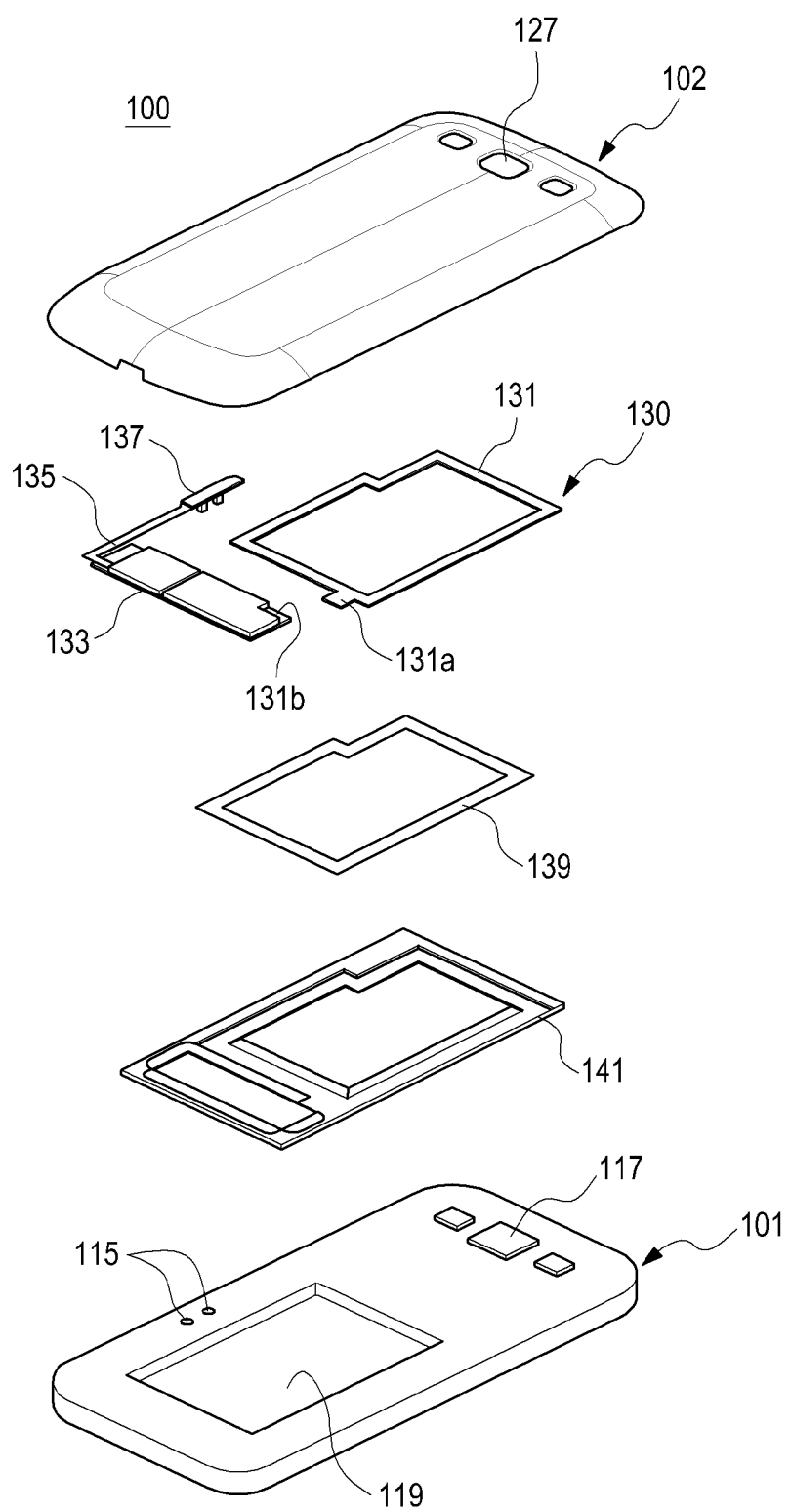
FIG. 1 is an exploded perspective view illustrating a portable terminal according to the prior art.
Figure 2:
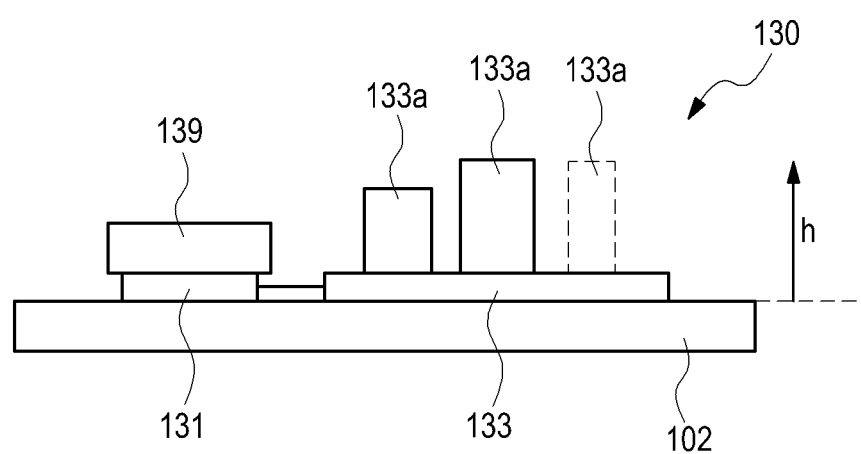
FIG. 2 is a side view illustrating a configuration of a wireless charging module of the portable terminal illustrated in FIG. 1.
Figure 3:
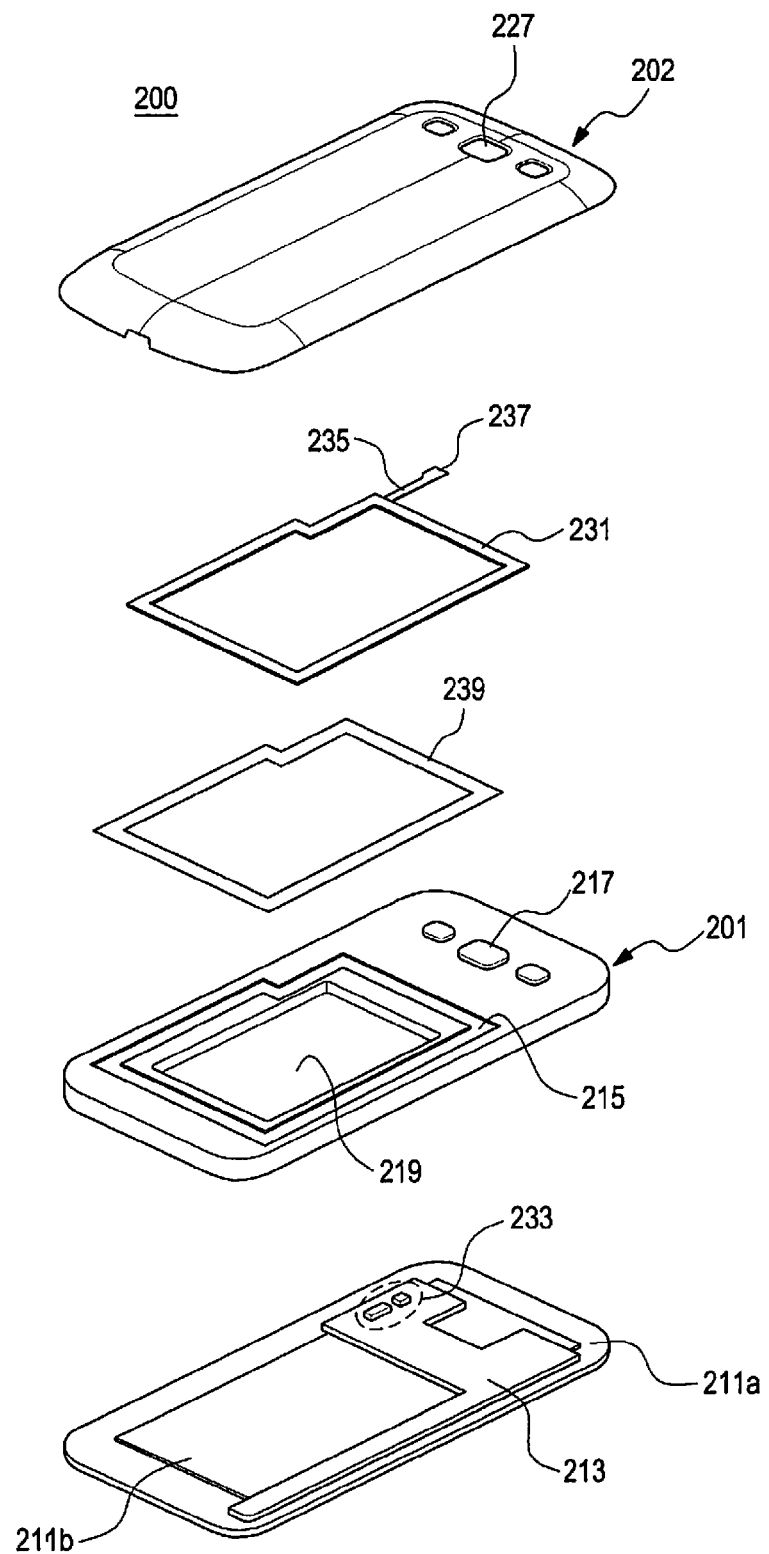
FIG. 3 is an exploded perspective view illustrating a portable terminal according to an embodiment of the present invention.
Figure 4:
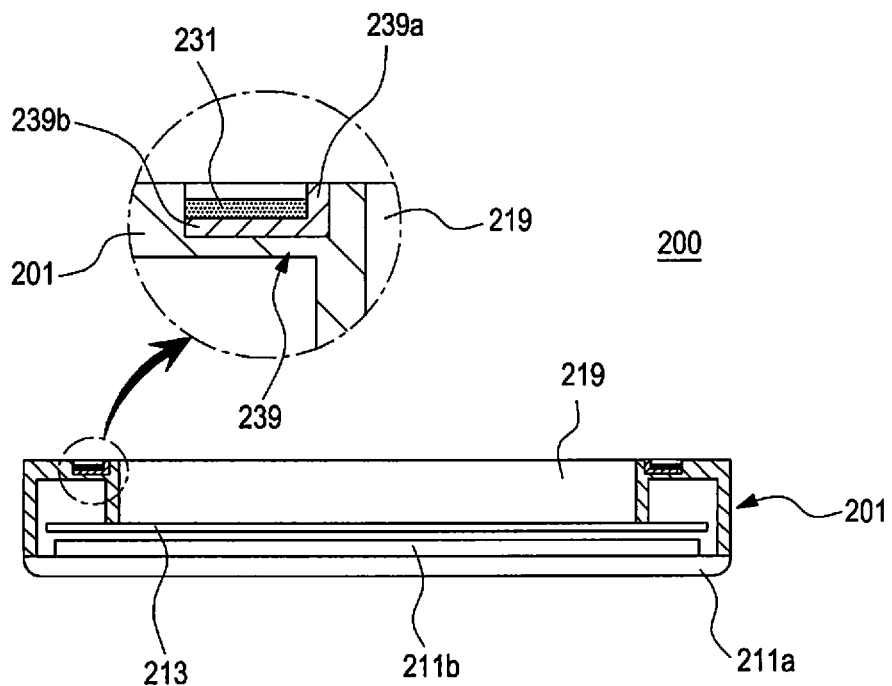
FIG. 4 is a partially cut-away, cross-sectional view illustrating the portable terminal illustrated in FIG. 3.

FIG. 3 is an exploded perspective view illustrating a portable terminal 200 according to an embodiment of the present invention, and FIG. 4 is a partially cut-away, cross-sectional view illustrating the portable terminal 200 illustrated in FIG. 3.

As illustrated in FIGS. 3 and 4, the portable terminal 200 according to an embodiment of the present invention includes a body 201, and a receiving-side resonant antenna 231 disposed on the body 201. The body 201 includes a battery mounting groove 219 formed on one surface, preferably, a back surface, and the receiving-side resonant antenna 231 is arranged parallel to at least three sides of the battery mounting groove 219.

A receiving circuit unit 233 is provided inside the body 201. The receiving circuit unit 233 is configured to convert a signal power provided from the receiving-side resonant antenna 231 into a charging power. In other words, the receiving-side resonant antenna 231 and the receiving circuit unit 233 may form a wireless charging module.

The body 201 accommodates a main circuit board 213 and a display module 211b, and a window member 211a is coupled to the front surface of the body 201. As described above, the battery mounting groove 219 is formed on the back surface of the body 201, and a camera module 217 may be provided at a side of the battery mounting groove 219. The display module 211b is installed to face the inner surface of the window member 211a and the main circuit board 213 is positioned inside the display module 211b. The receiving circuit unit 233 accommodated in the body 201 may be disposed on a board provided separately from the main circuit board 213. However, in an embodiment of the present invention, the receiving circuit unit 233 may be configured by circuit elements such as a charging control circuit chip and an inductor that are arranged on the main circuit board 213.

When the terminal 200 is provided with a separate cover member 202, the battery mounting groove 219 and the other components are concealed and protected. The cover member 202 is detachably provided on the back surface of the body 201 and includes an opening 227 so as to provide a photographing opening for the camera module 217.

The receiving-side resonant antenna 231 is a type of receiving-side resonator (RX resonator) which produces a signal power by a magnetic induction or magnetic resonance phenomenon according to an electromagnetic field generated at a primary coil of a charger (not illustrated) and transmits the signal power to the receiving circuit unit 233. The receiving-side resonant antenna 231 may be configured in various patterns using a flat or film type conductive material such as a copper plate, silver or gold capable of being attached to the outer peripheral surface of the body 201. When the receiving circuit unit 233 includes a wireless charging circuit configured by a charging control circuit, an inductor or the like, the signal power provided from the receiving-side resonant antenna 231 is converted into a charging power so as to charge the battery pack coupled to the battery mounting groove 219.

A flexible printed circuit board 235 is provided at a side of the receiving-side resonant antenna 231 and a connection connector 237 is provided at an end of the flexible printed circuit board 235. The connection connector 237 is connected to a socket (not illustrated) provided on the main circuit board 213 to connect the receiving-side resonant antenna 231 to the receiving circuit unit 233. That is, in practice, the flexible printed circuit board 235 and the connection connector 237 are used as a connection device that connects the receiving-side resonant antenna 231 to the receiving circuit unit 233.

The body 201 may be provided with an accommodation groove 215 in order to provide a space where the receiving-side resonant antenna 231 is attached to the outer peripheral surface of the body 201. The accommodation groove 215 has a shape and depth corresponding to the shape of the receiving-side resonant antenna 231. In this event, the receiving-side resonant antenna 231 is arranged parallel to the battery mounting groove 219 in a form of surrounding all four sides of the battery mounting groove 219 or parallel to at least three sides of the battery mounting groove 219. That is, when the back side of the body 201 is shown in a plan view, the receiving-side resonant antenna 231 is arranged around the battery mounting groove 219 and, when the body 201 is shown in a side view or a cross-sectional view as illustrated in FIG. 4, the receiving-side antenna 231 is arranged parallel to the battery mounting groove 219.

The receiving-side resonant antenna 231, which is operated by magnetic induction or magnetic resonance, generates considerable electromagnetic waves. Thus, in order to reduce or eliminate the effects exerted on the battery pack coupled to the body 201 or circuit devices inside the body 201, for example, the circuit on the main circuit board 213, the terminal 200 is provided with an electromagnetic shielding member 239. The electromagnetic shielding member 239 is arranged between the receiving-side resonant antenna 231 and the circuit devices accommodated within the internal space of the body 201 and between the receiving-side resonant antenna 231 and the battery mounting groove 219.

Referring to FIG. 4, the electromagnetic shielding member 239 includes a first shielding portion 239a provided between the battery mounting groove 219 and the receiving-side resonant antenna 231 and a second shielding portion 239b extending from the first shielding portion 239a and positioned between the receiving-side resonant antenna 231 and a circuit device, in particular, the main circuit board 213, as described above. Accordingly, the first shielding portion 239a and second shielding portion 239b are attached to an inner wall of the accommodation groove 215 and a bottom surface of the accommodation groove 215, respectively. Of course, the electromagnetic shielding member 239 may be provided to surround the receiving-side resonant antenna 231. However, it is noted that the electromagnetic shielding member 239 should allow the receiving-side resonant antenna 231 to open toward the outer surface of the body 201 to interact with the primary coil provided in an external charger or the like. As a result, the receiving-side resonant antenna 231 may suppress the electromagnetic waves generated around the receiving-side resonant antenna 231 from affecting the inside of the body 201 while producing a signal power by magnetic induction or magnetic resonance.

Figure 5:
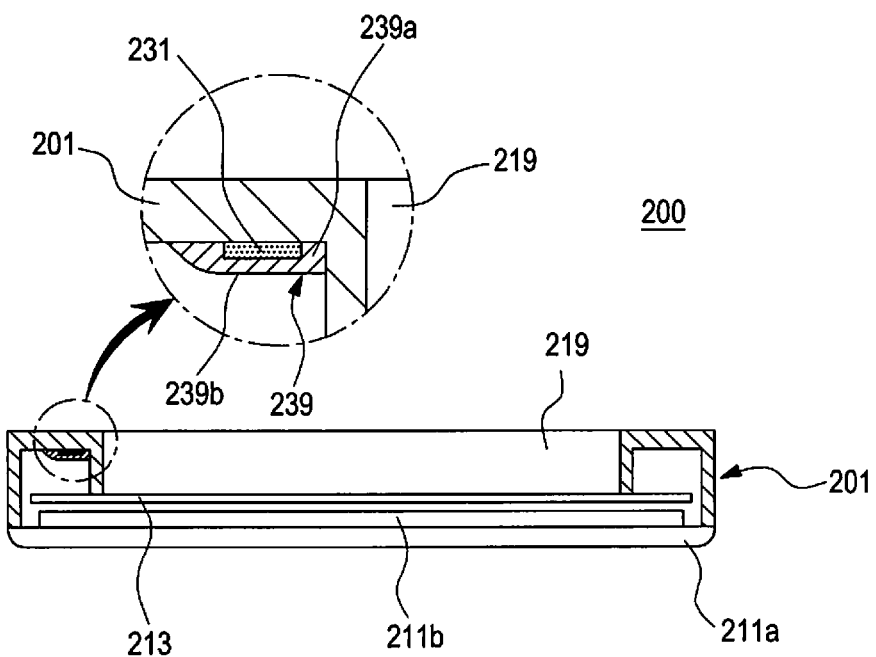
FIG. 5 is a cross-sectional view illustrating a modified embodiment of the portable terminal illustrated in FIG. 4.

FIG. 5 illustrates a partially modified part of the configuration of the portable terminal illustrated in FIGS. 3 and 4. Specifically, the portable terminal illustrated in FIG. 5 is different from the portable terminal illustrated in FIG. 4 in that FIG. 5 shows a structure that accommodates the receiving-side resonant antenna in the inside of the body. Accordingly, it shall be noted that the configuration which may be easily understood through the structure of the portable terminal illustrated in FIGS. 3 and 4 will be assigned the same reference numerals or no reference numeral and the detailed descriptions thereof may also be omitted.

The portable terminal 200 illustrated in FIG. 5 has a receiving-side resonant antenna 231 arranged around the battery mounting groove 219 within the body 201. The receiving-side resonant antenna 231 is a type of receiving resonator (RX resonator) which may be fabricated in a flat plate or film shape or in a form of a flexible printed circuit board. That is, the receiving-side resonant antenna 231 may be configured in various patterns using a copper plate or a conductive material such as gold or silver and take a form of a flexible printed circuit board in external appearance. The receiving-side resonant antenna 231 is attached to the inner peripheral surface facing the back surface in the inside of the body 201. The body 201 is made of a synthetic resin material so that the signal power provided from the external charger may be smoothly transmitted to the receiving-side resonant antenna 231.

When the receiving-side resonant antenna 231 is attached to the inner peripheral surface of the body 201, an electromagnetic shielding member 239 is attached to the inner peripheral surface of the body 201. The electromagnetic shielding member 239 includes a first shielding portion 239a and a second shielding portion 239b. The first shielding portion 239a is interposed between the battery mounting groove 219 and the receiving-side resonant antenna 231 and the second shielding portion 239b extends from the first shielding portion 239a and is interposed between the receiving-side resonant antenna 231 and the circuit devices inside the body 201. Meanwhile, the receiving-side resonant antenna 231 may be completely wrapped by the electromagnetic shielding member 239 so that the receiving-side resonant antenna 231 is not exposed to the inside of the body 201. As a result, even though the receiving-side resonant antenna 231 is positioned parallel to the battery pack mounted in the battery mounting groove 219 inside the body 201, electromagnetic interference caused by magnetic resonance or magnetic induction phenomenon may be prevented since the electromagnetic shielding member 239 is interposed between the receiving-side resonant antenna 231 and the battery mounting groove 219 as well as between the battery mounting groove 219 and the circuit devices.

Figure 6:
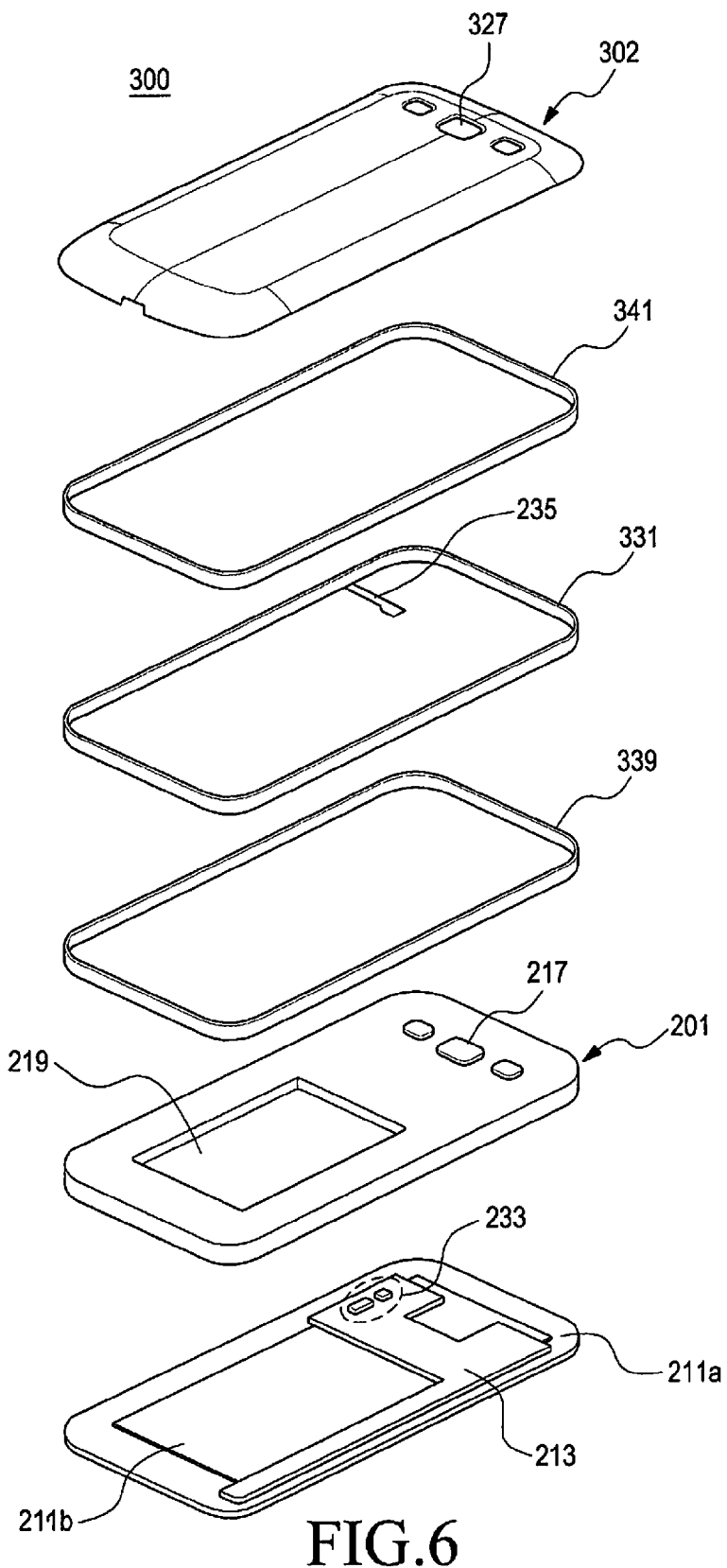
FIG. 6 is an exploded perspective view illustrating a portable terminal according to another embodiment of the present invention.

FIG. 6 is an exploded perspective view illustrating a portable terminal 300 according to another embodiment of the present invention. The portable terminal 300 illustrated in FIG. 6 is different from those of the preceding embodiments in that the receiving-side resonant antenna 331 is arranged to surround the outer surface of the terminal body 201. Accordingly, it is noted that the components which may be easily understood through the preceding embodiments will be assigned the same reference numerals or no reference numeral and the detailed descriptions thereof may also be omitted.

The receiving-side resonant antenna 331 of the portable terminal 300 according to the embodiment of the present invention is formed in a form of a strip surrounding the outer surfaces of the body 201 of the terminal and arranged parallel to the battery mounting groove 219 formed on the body 201 as well as to the battery pack mounted in the battery mounting groove 219. However, when the receiving-side resonant antenna 331 is arranged to surround the outer surface of the body 201, it is not necessary for the receiving-side resonant antenna to be arranged to surround the entire outer surface of the body 201 as illustrated in FIG. 6. A magnetic resonance or magnetic induction structure for wireless charging may be implemented even if the receiving-side resonant antenna 331 is arranged to wrap at least three outer surfaces among the outer surfaces of the body 201.

The receiving-side resonant antenna 331 is provided with a flexible printed circuit board 235 for connection with a receiving circuit unit 233 provided inside the body 201. A connector is provided at an end of the flexible printed circuit board 235 to be connected to a socket (not illustrated) installed on the main circuit board 213. Meanwhile, in order to suppress the electromagnetic waves generated by the receiving-side resonant antenna 331 from affecting the inside of the body 201 and the battery pack mounted in the battery mounting groove 219, the portable terminal 300 may be provided with an electromagnetic shielding member 339. The electromagnetic shielding member 339 is directly attached to the outer surfaces of the body 201 to be arranged between the receiving-side resonant antenna 331 and the circuit devices provided in the inner space of the body 201 and between the receiving-side resonant antenna 331 and the battery pack. That is, the receiving-side antenna 331 is practically attached on the electromagnetic shielding member 339.

Meanwhile, since the receiving-side resonant antenna 331 is made of a copper plate or a conductive material such as silver or gold to have a magnetic induction or magnetic resonance structure, an induced current or a leakage current may flow in the receiving-side resonant antenna 331. Accordingly, when the receiving-side resonant antenna 331 is installed on the outer surfaces of the body 201, the receiving-side resonant antenna 331 is prevented from being exposed to the outside using an insulation member 341.

The insulation member 341 has a strip shape similar to the receiving side resonant antenna 331 and is attached to the outer surface of the receiving-side resonant antenna 331. However, the insulation member 341 does not have to be attached to the outer surface of the receiving-side resonant antenna 331. For example, a metallic portion of the receiving-side resonant antenna 331 may be coated with an insulation material so that the insulation member may be formed integrally with the receiving-side resonant antenna 331.

The portable terminal configured as described above may avoid being stacked on/under a battery pack when the receiving-side resonant antenna is arranged, as the antenna is arranged around the battery-mounting groove in which the battery pack is mounted. For example, a groove, which accommodates the receiving-side resonant antenna on the back surface of the body concealed by a cover member, is formed around the battery mounting groove or arranged inside the body or at an outer peripheral surface of the body. Thus, the portable terminal according to the present invention may be easily incorporated with additional communication functions, e.g. a wireless charging function, without substantially affecting the thickness of the portable terminal.

As described above, in a portable terminal according to the present invention, a receiving-side resonant antenna and an electromagnetic shielding member are arranged parallel to a battery mounting groove. Thus, the receiving-side resonant antenna and the electromagnetic shielding member do not substantially affect the thickness of the portable terminal. That is, as described above, a conventional wireless charging module causes the thickness of a portable terminal to be increased up to about 1.6 mm when the wireless charging module is equipped in the portable terminal. However, the wireless charging module according to the present invention enables a portable terminal to be conveniently used by providing a wireless charging function without substantially increasing the thickness of the portable terminal.

While the present invention has been described in detail in connection with various embodiments, it will be obvious to a person having an ordinary skill in the art that various modifications may be made without departing from the scope of the present invention.

The invention claimed is:

1. A portable terminal comprising:
    a body having a back surface;
    a battery mounting groove formed on the back surface;
    an accommodation groove formed on the back surface around a circumference of the battery mounting groove, the accommodation groove having a shape and a depth of a receiving-side resonant antenna, the receiving-side resonant antenna attached to the accommodation groove; and
    an electromagnetic shielding member provided on the body, wherein the electromagnetic shielding member comprises:
        a first shielding portion attached to an inner wall of the accommodation groove between the battery mounting groove and the receiving-side resonant antenna; and
        a second shielding portion attached to a bottom surface of the accommodation groove between the receiving-side resonant antenna and a circuit device.

2. The portable terminal as claimed in claim 1, wherein the second shielding portion extends from the first shielding portion.

3. The portable terminal as claimed in claim 1,
    wherein the receiving-side resonant antenna is attached to the electromagnetic shielding member.

4. The portable terminal as claimed in claim 1, further comprising an insulation member provided to wrap the receiving-side resonant antenna.

5. The portable terminal as claimed in claim 1, wherein the circuit device comprises a main circuit board which is accommodated inside the body and on which a receiving circuit unit is disposed, the receiving-side resonant antenna being connected to the receiving circuit unit.

6. The portable terminal as claimed in claim 5, wherein the receiving circuit unit includes a charging control circuit chip.

* * * * *